United States Patent
Hofler

(10) Patent No.: US 9,470,307 B2
(45) Date of Patent: Oct. 18, 2016

(54) METHOD FOR OPERATING A VEHICLE DRIVE TRAIN

(71) Applicant: ZF Friedrichshafen AG, Friedrichshafen (DE)

(72) Inventor: Hans Hofler, Immenstaad am Bodensee (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 231 days.

(21) Appl. No.: 14/358,357

(22) PCT Filed: Dec. 5, 2012

(86) PCT No.: PCT/EP2012/074395
§ 371 (c)(1),
(2) Date: May 15, 2014

(87) PCT Pub. No.: WO2013/107558
PCT Pub. Date: Jul. 25, 2013

(65) Prior Publication Data
US 2014/0315685 A1    Oct. 23, 2014

(30) Foreign Application Priority Data
Jan. 16, 2012   (DE) .................. 10 2012 200 537

(51) Int. Cl.
*F16H 59/42*    (2006.01)
*B60W 30/18*    (2012.01)
(Continued)

(52) U.S. Cl.
CPC ........ *F16H 59/42* (2013.01); *B60W 30/18072* (2013.01); *B60W 30/18136* (2013.01);
(Continued)

(58) Field of Classification Search
CPC ............ B60W 2510/0241; B60W 2710/0644; B60W 30/18136; F16H 2059/366; Y10T 477/638; Y10T 477/6437; Y10T 477/688; Y10T 477/755
See application file for complete search history.

(56) References Cited

U.S. PATENT DOCUMENTS 5,529,546 A     6/1996 Ishino et al.
5,613,583 A *   3/1997 Kono ................. F16H 61/143
                                                    192/3.31
(Continued)

FOREIGN PATENT DOCUMENTS

DE     40 20 959 A1    1/1991
DE    196 41 723 A1    6/1997
(Continued)

OTHER PUBLICATIONS

German Search Report Corresponding to 10 2012 200 537.4 mailed Nov. 30, 2012.
(Continued)

*Primary Examiner* — Huan Le
(74) *Attorney, Agent, or Firm* — Davis & Bujold, PLLC; Michael J. Bujold

(57) ABSTRACT

A method of operating a vehicle drive-train including a drive engine, a transmission device and a drive output. At least one shifting element is provided in the transmission, whose transmission capacity for obtaining an operating condition of the transmission device can at least, in part, be continuously varied. During overdrive operation of the drive-train, torque present at the output can be supported at least partially by the transmission device in the area of the drive engine. During overdrive operation, the transmission capacity of one of the transmission shifting elements, which to obtain the current operating condition of the transmission device is essentially at least approximately zero, is set to a value at which at least part of the torque present at the drive output can be supported in the area of the transmission device, and the rotational speed of the drive engine has a value below a predefined limit value.

7 Claims, 2 Drawing Sheets

(51) Int. Cl.
  *F16H 61/00* (2006.01)
  *F16H 61/21* (2006.01)
  *F16H 59/36* (2006.01)
  *F16H 61/04* (2006.01)
  *F16H 3/093* (2006.01)

(52) U.S. Cl.
  CPC .......... *F16H61/0059* (2013.01); *F16H 61/04* (2013.01); *F16H 61/21* (2013.01); *F16H 2003/0935* (2013.01); *F16H 2059/366* (2013.01); *F16H 2061/0496* (2013.01); *Y10T 477/688* (2015.01)

(56) References Cited

U.S. PATENT DOCUMENTS

| | | |
|---|---|---|
| 6,413,189 B1 | 7/2002 | Spiess et al. |
| 7,416,071 B2 | 8/2008 | Popp et al. |
| 2003/0045400 A1* | 3/2003 | Ito ................... B60W 30/1819 477/176 |
| 2006/0116806 A1* | 6/2006 | Steen ................... B60W 10/06 701/51 |
| 2006/0243501 A1* | 11/2006 | Hidaka ................... B60K 6/48 180/65.1 |

FOREIGN PATENT DOCUMENTS

| | | |
|---|---|---|
| DE | 103 26 839 A1 | 12/2004 |
| EP | 1 097 318 B1 | 7/1999 |
| EP | 1 995 499 A1 | 11/2008 |
| WO | 00/03160 A1 | 1/2000 |
| WO | 2009/130553 A1 | 10/2009 |

OTHER PUBLICATIONS

International Search Report Corresponding to PCT/EP2012/074395 mailed Feb. 27, 2013.
Written Opinion Corresponding to PCT/EP2012/074395 mailed Feb. 27, 2013.

* cited by examiner

METHOD FOR OPERATING A VEHICLE DRIVE TRAIN

This application is a National Stage completion of PCT/EP2012/074395 filed Dec. 5, 2012, which claims priority from German patent application serial no. 10 2012 200 537.4 filed Jan. 16, 2012.

FIELD OF THE INVENTION

The invention concerns a method for operating a vehicle drive-train, of the type defined in more detail below.

BACKGROUND OF THE INVENTION

Vehicle drive-trains known from practice, in each case built with a drive engine, a transmission device and a drive output, often have transmissions designed as hydrostatically power-branched powershift transmissions. During overdrive operation of the vehicle drive-train, it is known that during a deceleration process of a vehicle built with the vehicle drive-train or while driving downhill, torque resulting from the moving vehicle mass and applied at the drive output is transmitted from the drive output, via the transmission, in the direction toward the drive engine. The applied thrust torque is absorbed by a hydraulic motor of the transmission device and is then supported by a hydraulic pump device in the area of the drive engine, the latter usually being in the form of an internal combustion engine. If the supporting torque available in the area of the drive engine during overdrive operation of the vehicle drive-train is too low, in some circumstances this results in an undesirably large increase of the rotational speed of the drive engine.

In order to avoid such rotational speed increases in the area of the drive engine, a driver of the vehicle built with such a vehicle drive-train has to actuate the service brakes. In vehicle systems that assist the driver, when the drive engine runs at undesirably high rotational speeds the service brakes are automatically actuated in order to limit the rotational speed of the drive engine.

However, particularly during longer downhill driving stretches, this is not desired since particularly when the service brakes are actuated automatically, overloading can occur in the area of the service brakes.

A method and a device for controlling a motor vehicle drive-train are known from the document EP 1 097 318 B1. The motor vehicle drive-train is built with a hydrostatically-mechanically power-branched transmission whose transmission ratio is continuously variable. If the driver calls for a driving direction reversal while moving at above a predetermined speed limit, in the method the driving speed is reduced by continuously regulated and controlled downshifting of the transmission ratio in the area of the transmission. When the speed reaches or falls below the speed limit, the previously open clutch for the new driving direction is brought by pressure modulation to a frictional slipping condition and, overlapping this frictional slipping operation in time, the closed and slip-free clutch for the previous driving direction is also brought to a frictional slipping condition by reducing its closing pressure, so that the drive torque is transferred without interruption from the old clutch to the new clutch. The friction work of the clutch for the old driving direction can be used to produce a braking torque additional to the braking power of the engine.

Furthermore, it is proposed to bring the clutch of the previous driving direction to frictional slipping operation, whereas the clutch for the new driving direction is only brought to slipping operation when the speed limit has been reached, in order to avoid excessive thermal loading. During this the frictional slipping condition of the old driving direction clutch should be maintained until the driving speed of the vehicle has decreased sufficiently to enable further deceleration to be effected by the clutch for the new driving direction.

Even this procedure is not suitable, to the desired extent, for avoiding an unacceptably high rotational speed in the area of the drive engine during overdrive operation of a vehicle while at the same time the thrust torque is high.

SUMMARY OF THE INVENTION

Thus, the purpose of the present invention is to provide a method for operating a vehicle drive-train, by means of which a desired thrust torque can be produced at the drive output without giving rise to unacceptably high rotational speeds in the area of a drive engine of the vehicle drive-train.

According to the invention, this objective is achieved with a method having the characteristics below.

In the method according to the invention for operating a vehicle drive-train that comprises a drive engine, a transmission device and a drive output, wherein, in the area of the transmission device at least one shifting element is provided, whose transmission capacity for producing an operating condition of the transmission can at least in part be varied continuously, during overdrive operation of the vehicle drive-train a torque present at the drive output can be supported at least partially in the area of the drive engine by way of the transmission device.

According to the invention, during overdrive operation of the vehicle drive-train the transmission capacity of one of the shifting elements of the transmission, which to obtain the current operating condition of the transmission is essentially at least approximately equal to zero, is set to a value at which at least part of the torque at the drive output can be supported in the area of the transmission and the rotational speed of the drive engine has values below a predefined limit value.

By virtue of the procedure according to the invention the braking power of a vehicle built with a vehicle drive-train can be increased during overdrive operation of the vehicle drive-train, by engaging shifting elements, namely disk clutches or disk brakes of a powershift transmission that are open in the gear engaged. For this, the procedure according to the invention makes use of the fact that in drive systems, also including those formed with a hydrostatically power-branched powershift transmission having disk clutches, in various gears there are frictional shifting elements which are open and not engaged in the force flow of the vehicle drive-train, whose transmission capacity in the current operating condition of the transmission is therefore essentially equal to zero. Increasing the transmission capacity of at least one of those frictional shifting elements produces a bracing torque in the area of the transmission, which is suitable for supporting in the area of the transmission at least part of the torque present at the drive output during overdrive operation of a vehicle drive-train, and thereby relieving the load on a drive engine of the vehicle drive-train, and with the engine preferably being in the form of an internal combustion engine, this avoids an undesirably large increase of the rotational speed of the drive engine.

In transmission devices made with a reversing gear system having a forward and a reversing clutch, the transmission capacity of the driving direction clutch in the transmission that is currently in the open operating condition can be increased in order to produce a bracing torque. Moreover, the shifting elements that have to be closed in order to produce an additional supporting torque in the area of the transmission device can be frictional clutches or brakes of the transmission, which are engaged in the force flow of the vehicle drive-train during normal operation of the transmission in order to obtain gears of the transmission.

By virtue of the procedure according to the invention, if an unacceptable increase of the drive rotational speed of the drive engine is recognized during overdrive operation of a vehicle drive-train, the braking torque that can be applied at the drive output is increased by filling open frictional shifting elements by means of a partial pressure and thereby raising their transmission capacity to a defined level. In the area of the transmission this additional engagement of the shifting elements produces a bracing torque which provides an additional braking torque, by which part of the torque present at the drive output is supported in the area of the transmission in order to keep or bring the rotational speed of the drive engine below a predefined limit value.

In order not to overload the shifting element of the transmission device that is additionally engaged in each case, in an advantageous variant of the method according to the invention the transmission capacity of the shifting element is increased at most to a predefined maximum value at which the shifting element operates with slip.

If it is found that the rotational speed of the drive engine cannot be brought to or kept below the predefined limit value by means of the additionally engaged shifting element, then in another advantageous variant of the method according to the invention the transmission capacity of a further shifting element of the transmission, which to obtain the current operating condition of the transmission is essentially at least approximately equal to zero, is set to a value at which at least part of the torque present at the drive output can be supported in the area of the transmission and the rotational speed of the drive engine has values below the predefined limit value.

In order also not to overload the further, additionally engaged shifting element, the transmission capacity of the further shifting element is increased at most to a predefined value at which the further shifting element operates with slip. In a further advantageous variant of the method according to the invention, if a predefined threshold value of the rotational speed of the drive engine is exceeded, the transmission capacity of the shifting element and preferably the transmission capacity of the further shifting element is/are automatically increased in the direction toward the predefined value, in order to be able to avoid an undesirably large increase of the rotational speed of the drive engine with little control and regulation effort.

In a further advantageous variant of the method according to the invention, to ensure a driving operation mode that is comprehensible to a driver, when the rotational speed of the drive engine falls below the predefined threshold value the transmission capacity of the shifting element and preferably the transmission capacity of the further shifting element is/are set substantially to zero.

In a further advantageous variant of the method according to the invention, in the area of the additionally engaged shifting element and preferably in the area of the additionally engaged further shifting element, in order to be able to dissipate the heat energy generated by friction and thereby to minimize the thermal loading in the area of the shifting elements, it is provided that if a transmission capacity of the shifting element and preferably a transmission capacity of the further shifting element is/are greater than zero, then forced cooling is applied to the shifting element and preferably to the further shifting element.

Both the characteristics indicated in the claims and those indicated in the example embodiment of the object of the invention described below are in each case suitable, whether in isolation or in any combination with one another, to develop further the object according to the invention. In relation to such further development of the object of the invention, the respective combinations of characteristics do not have any restrictive force but are presented essentially only as examples.

BRIEF DESCRIPTION OF THE DRAWINGS

Further advantages and advantageous further developments of the invention emerge from the example embodiment whose principle is described with reference to the sole drawing.

DETAILED DESCRIPTION OF THE PREFERRED EMBODIMENTS

Figure 1:
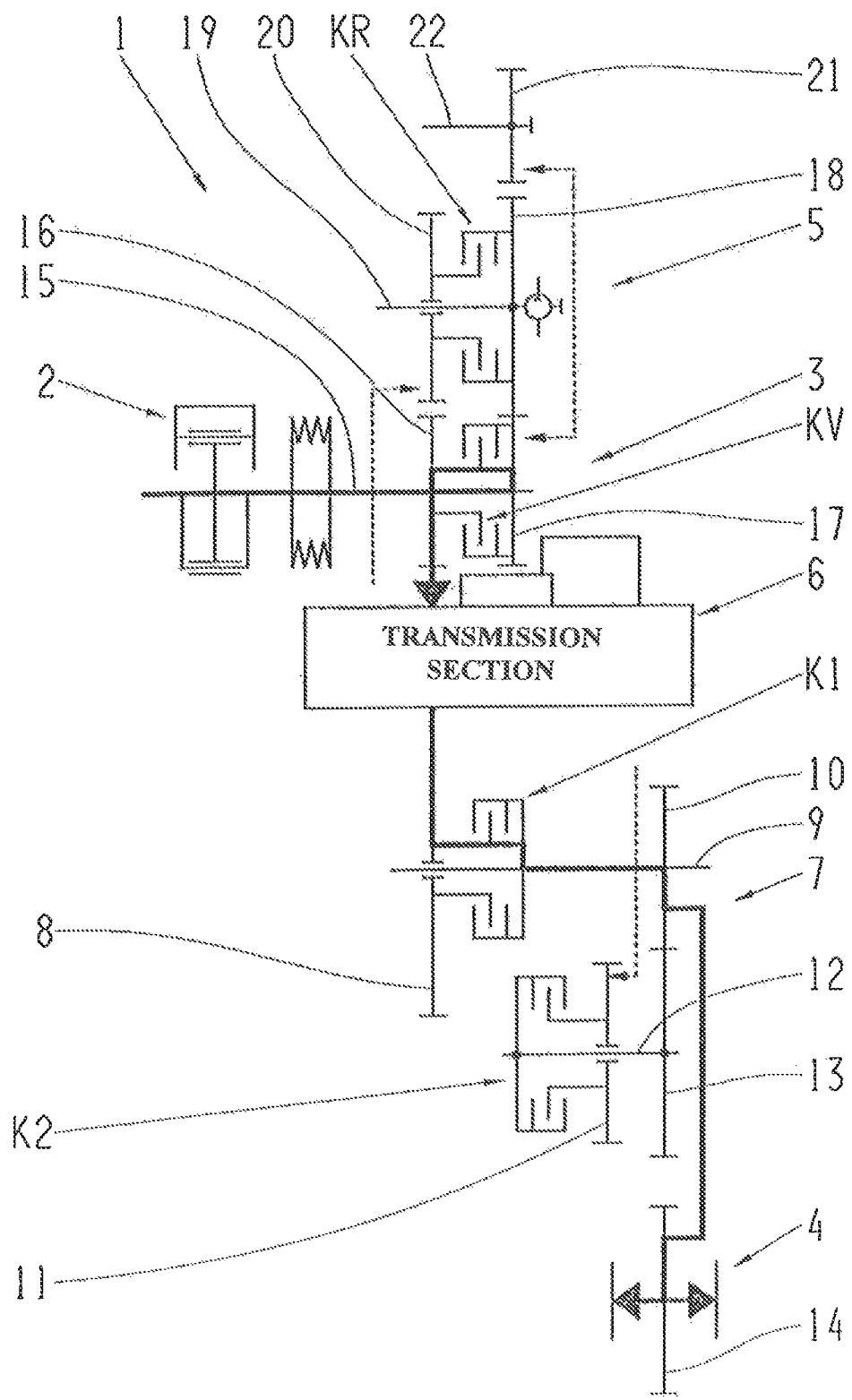
FIG. 1, is a very schematic representation of a vehicle drive-train, with which the procedure according to the invention can be implemented.

FIG. 1 shows a very schematic representation of a vehicle drive-train 1 which comprises a drive engine 2, a transmission device 3 and a drive output 4. In this case the transmission device 3 is designed with a so-termed reversing gear system 5 in the area of which the drive engine 2 is coupled to the transmission device 3. The reversing gear system 5 is followed by a section 6 of the transmission which, in a known way comprises, besides a mechanical power branch, also a hydrodynamic power branch.

In the transmission section 6, during traction operation of the vehicle drive-train 1 the torque delivered by the drive engine 2 is, as is known, directed in part by way of the mechanical power branch and in part by way of the hydrodynamic power branch, then summed in the area of a summation planetary gearset, and thereafter passed on to a gearshifting section 7 of the transmission device 3.

In this case the gearshifting section 7 comprises two shifting elements K1 and K2 in the form of frictional clutches, such that by means of the shifting element K1 a loose wheel 8 can be connected rotationally fixed to a shaft 9 to which a fixed wheel 10 is connected in a rotationally fixed manner. By means of the second frictional shifting element K2 a further loose wheel 11 can be connected rotationally fixed to a shaft 12 which, in turn, is coupled in a rotationally fixed manner to a further fixed wheel 13.

The loose wheel 8 and the further loose wheel 11 in each case mesh with a respective gearwheel of the transmission section 6, while the fixed wheels 10 and 13 are functionally connected to an additional fixed wheel 14 itself connected to the drive output 4. The fixed wheels 10 and 13 mesh with one another and the fixed wheel 10 meshes with the additional fixed wheel 14.

When the first frictional shifting element K1 is closed and at the same time the second frictional shifting element K2 is open, a first transmission ratio range is engaged in the transmission device 3 within which the transmission ratio of the transmission device 3 can be varied continuously by appropriate adjustment of a hydrostatic unit of the hydrodynamic power branch of the transmission section 6 that comprises a pump and a motor unit. In contrast, if the first frictional shifting element K1 is open and the second frictional shifting element K2 is closed, a second transmission ratio range is engaged in the transmission device 3 within which, again, the transmission ratio of the transmission device 3 can be varied continuously by appropriate actuation of the hydrostatic unit.

While the vehicle drive-train 1 is operating in a forward driving direction or a reverse driving direction, both the first transmission ratio range and the second transmission ratio range are available. The forward driving mode of the vehicle drive-train 1 is engaged when a frictional shifting element KV of the reversing gear system 5 is closed and at the same time a further frictional shifting element KR of the reversing gear system 5 is in its open operating condition.

When in its closed operating condition, the first frictional shifting element KV of the reversing gear system 5, or forward driving clutch, connects a loose wheel 16 mounted to rotate on a transmission input shaft 15, to the transmission input shaft 15 in a rotationally fixed manner. In addition a fixed wheel 17 is connected rotationally fixed to the transmission input shaft 15, which wheel 17 meshes with a fixed wheel 18 associated with the shifting element KR or reverse driving clutch. The fixed wheel 18 is arranged rotationally fixed on a shaft 19 to which a loose wheel 20 can be connected rotationally fixed by means of the reverse driving clutch KR. Both the loose wheel 16 and the loose wheel 20 mesh with a gearwheel of the transmission section 6 whereby, depending on the transmission capacities of the forward driving clutch KV and the reverse driving clutch KR, the torque from the drive engine 2 is either directed via the transmission input shaft 15 and the loose wheel 16 into the transmission section 6, or by the transmission input shaft 15 and the fixed wheel 17 to the fixed wheel 18 and the loose wheel 20, and from there toward the transmission section 6.

In addition the fixed wheel 17 meshes with a further fixed wheel 21, which is connected rotationally fixed to a so-termed PTO shaft 22 (Power-Take-Off shaft), by way of which, for example, attachment units of a tractor built with the vehicle drive-train 1 can be supplied with torque from the drive engine 2.

Figure 2:
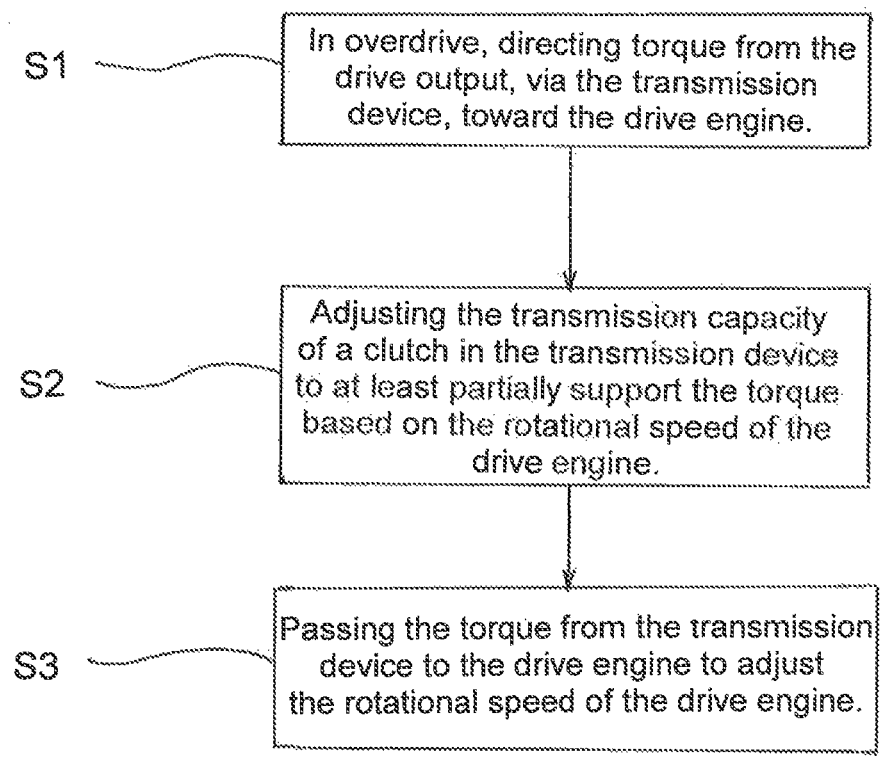
FIG. 2, is a flow diagram showing the steps of the procedure according to the invention.

As shown in the flow diagram of FIG. 2, when the vehicle drive-train 1 is in overdrive operation, in a first step S1 torque present at the drive output 4 is directed, via the transmission device 3, toward the drive engine 2. Then in a second step S2, depending on the operating condition of the drive engine 2 at the time, the torque is at least partially supported in the transmission device. In that case the thrust torque from the drive output 4 is absorbed in the area of the hydraulic motor in the transmission section 6 and subsequently the torque is passed on by the hydraulic pump toward the drive engine 2 in step S3, which in this case is in the form of an internal combustion engine or a diesel engine, where it is at least partially supported to adjust the rotational speed of the drive engine 2.

If the supporting torque available from the drive engine 2 during overdrive operation is too small, in some circumstances the rotational speed of the drive engine 2 increases to unacceptable values. To avoid racing in the area of the drive engine 2, the procedure described in more detail below is proposed.

If the vehicle drive-train 1 is in overdrive operation and, in the transmission device 3, the forward driving clutch KV is for example fully closed while at the same time the reverse driving clutch is for example fully open, and if in addition the first transmission ratio range is engaged in the transmission 3, then torque is directed from the drive output by way of the shaft 9, the transmission section 6 and the transmission input shaft 15 toward the drive engine 2. If the rotational speed of the drive engine 2 increases to a predefined limit value or the rotational speed of the drive engine 2 exceeds a predefined threshold value, the transmission capacity of the reverse driving clutch KR is increased from zero to a value at which a part of the torque present at the drive output 4 is supported in the area of the transmission device 3, such that the rotational speed of the drive engine 2 is brought to below a predefined limit value.

In order to avoid thermal overloading of the reverse driving clutch KR, the transmission capacity of the reverse driving clutch is increased at most to a predefined value at which the reverse driving clutch is operating with slip and at the same time unacceptably high loads in the area of the reverse driving clutch KR are avoided. In addition it can also be provided that after increasing the transmission capacity of the reverse driving clutch KR, forced cooling is applied to it by acting upon it with cooling oil.

In the area of the transmission device 3 the additional actuation of the reverse driving clutch brings about a so-termed bracing of the transmission device 3, by virtue of which an additional braking torque is produced. The braking torque in the area of the transmission device 3 acts cumulatively with the thrust torque of the drive engine 2, so that part of the torque present at the drive output 4 can be supported in the area of the transmission device 3 and in the area of the drive engine 2 a smaller part has to be supported, and the load on the drive engine 2 is therefore reduced.

If the breaking torque produced by the additional actuation of the reverse driving clutch KR is not sufficient to prevent an undesirably large increase of the rotational speed of the drive engine 2, it is in addition possible to increase the transmission capacity of the second frictional shifting element K2 in the gearshifting section 7 and bringing the shifting element K2 to slipping operation. This in turn leads to further bracing in the area of the transmission device 3, from which an increase of the braking torque acting in the transmission device 3 results. Thus, part of the torque present at the drive output 4 can be supported in the area of the transmission device 3 and the load on the drive engine 2 can be relieved further.

However, depending on the application at the time there is also the possibility, during overdrive operation of the vehicle drive-train 1 preferably with the forward driving clutch KV fully closed and at the same time preferably with the shifting element K1 also fully closed, to first actuate the preferably fully open shifting element K2 of the gearshift section 7 in order to be able to support part of the torque present at the drive output 4 in the area of the transmission device 3. If this additional actuation of the second frictional shifting element K2 in the gearshift section 7, which then operates with slip, is not sufficient to bring the rotational speed in the area of the drive engine 2 below the predefined limit value or keep it there, it is then possible additionally to actuate the fully open reverse driving clutch KR to the extent described above, in order to be able to provide a larger braking torque in the area of the transmission device 3.

In order to be able to limit thermal loading to acceptable values in the area of the second frictional shifting element K2 as well, the transmission capacity of the second frictional shifting element K2 is also increased to at most a predefined value at which the second frictional shifting element K2 is operated with slip and unacceptably high loads are reliably avoided. Furthermore, the additionally actuated frictional shifting element K2 can also be force-cooled by acting upon it with cooling oil in order, with little cost and effort, to be able to limit operating temperatures in this area of the transmission device 3 to acceptable values.

If in the transmission device 3 reverse driving operation is activated and the reverse driving clutch KR is in its closed operating condition while the forward driving clutch KV is fully open, then if an unacceptably large increase of the rotational speed of the drive engine 2 is detected during overdrive operation of the vehicle drive-train 1, the transmission capacity of the forward driving clutch KV can be increased in order to provide a braking torque additional to the thrust torque of the drive engine 2.

During overdrive operation of the vehicle drive-train 1, if the second frictional clutch K2 is closed and the second transmission ratio range is engaged in the transmission device 3, and if the transmission capacity of the first frictional shifting element K1 in the gearshifting section 7 is essentially equal to zero, then the transmission capacity of the first frictional shifting element K1 can be increased to the extent described earlier at most up to a predefined value at which the first frictional shifting element K1 is operating with slip, in order to be able to provide an additional braking torque in the area of the transmission device 3 and to be able to support part of the torque present at the drive output 4 in the area of the transmission device 3, and thus to be able to bring the rotational speed of the drive engine 2 below the defined limit value or at least keep it at that level.

The additional actuation of whichever of the shifting elements KV, KR, K1 and/or K2 have not already been actuated takes place automatically when the rotational speed of the drive engine 2 reaches a predefined maximum value. Once the rotational speed of the drive engine 2 falls below the predefined maximum, the additional actuation of the shifting elements KV, KR, K1 and/or K2 is terminated again, so that the transmission capacities of the additionally actuated shifting elements KV, KR, K1 or K2 then decrease again essentially to zero.

The additional actuation of at least one of the shifting elements KV, KR, K1 and/or K2 and the regulation of the braking torque provided by the additionally actuated shifting element KV, KR, K1 and/or K2 can be carried out in the area of a control unit, for example the electronic control system of the transmission or suchlike, of a vehicle built with the vehicle drive-train 1. The control parameter used for this is the rotational speed signal from the drive engine 2.

INDEXES

1 Vehicle drive-train
2 Drive engine
3 Transmission device
4 Drive output
5 Reversing gear system
6 Transmission section
7 Gearshifting section
8 Loose wheel
9 Shaft
10 Fixed wheel
11 Loose wheel
12 Shaft
13 Further fixed wheel
14 Additional fixed wheel
15 Transmission input shaft
16 Loose wheel
17 Fixed wheel
18 Fixed wheel
19 Shaft
20 Loose wheel
21 Fixed wheel
22 PTO shaft
KV Forward-driving clutch
KR Reverse-driving clutch
K1, K2 Frictional shifting elements

The invention claimed is:

1. A method of operating a vehicle drive-train (1) that comprises a drive engine (2), a transmission device (3) and a drive output (4), wherein at least one shifting element (K1, K2, KV, KR) is provided, in an area of the transmission device (3), whose transmission capacity for obtaining an operating condition of the transmission device (3) is at least in part continuously varied and, during overdrive operation of the vehicle drive-train (1), torque that is present at the drive output (4) and directed toward the drive engine (2) can be supported at least partially in the transmission device (3), the method comprising:

during the overdrive operation of the vehicle drive-train (1), setting the transmission capacity of one of the shifting elements (K1, K2, KV, KR) of the transmission (3), which is substantially zero in a current operating condition of the transmission (3), to a value at which at least part of the torque present at the drive output (4) is supportable in the area of the transmission device (3), and at which a rotational speed of the drive engine (2) has a value below a predefined limit value.

2. The method according to claim 1, further comprising the step of setting the transmission capacity of a further shifting element (K1, K2, KV or KR) of the transmission device (3), which is also substantially zero in the current operating condition of the transmission, to a value at which at least part of the torque present at the drive output (4) is supportable in the area of the transmission device (3), and at which the rotational speed of the drive engine (2) has a value below the predefined limit value.

3. The method according to claim 2, further comprising the step of increasing at least one of the transmission capacity of the shifting element (K1, K2, KV or KR) and the transmission capacity of the further shifting element (K1, K2, KV or KR) at most to a predefined limit value at which the shifting element (K1, K2, KV or KR) and the further shifting element (K1, K2, KV or KR) operate with slip.

4. The method according to claim 3, further comprising the step of increasing the transmission capacity of the shifting element (K1, K2, KV or KR) and the transmission capacity of the further shifting element (K1, K2, KV or KR), in a direction toward the predefined limit value, if a predefined threshold value of the rotational speed of the drive engine (2) is exceeded.

5. The method according to claim 4, further comprising the step of, when the rotational speed of the drive engine (2) falls below the predefined threshold value, reducing the transmission capacity of the shifting element (K1, K2, KV or KR) and the transmission capacity of the further shifting element (K1, K2, KV or KR) to substantially zero.

6. The method according to claim 2, further comprising the step of force cooling the shifting element (K1, K2, KV or KR) and also the further shifting element (K1, K2, KV or KR) when the transmission capacity of the shifting element (K1, K2, KV or KR) and also that of the further shifting element (K1, K2, KV or KR) is greater than zero.

7. A method of operating a vehicle drive-train (1) that comprises a drive engine (2), a transmission device (3) and a drive output (4), the transmission device (3) comprises at least one shifting element (K1, K2, KV, KR) having a transmission capacity that is at least partially continuously variable for obtaining an operating condition of the transmission device (3), the method comprising:

during overdrive operation of the vehicle drive-train (1), supporting torque that is present at the drive output (4) at least partially in an area of the transmission device (3) and directed toward the drive engine (2);

setting, during the overdrive operation of the vehicle drive-train (1), the transmission capacity of the at least one shifting element (K1, K2, KV, KR) of the transmission (3), from a value which is at least approximately zero n a current operating condition of the transmission (3), to a value at which at least part of the torque present at the drive output (4) is supported in the area of the transmission device (3), and at which a rotational speed of the drive engine (2) has a value below a predefined limit value.

\* \* \* \* \*